United States Patent
Dupraz et al.

(10) Patent No.: US 7,336,461 B2
(45) Date of Patent: Feb. 26, 2008

(54) METHOD FOR DETERMINING THE MOMENT OF CLOSURE OF A CIRCUIT BREAKER ON A HIGH VOLTAGE LINE

(75) Inventors: Jean-Pierre Dupraz, Bressolles (FR); Houria Siguerdidjane, Bures sur Yvette (FR); Farah Boudaoud, Creteil (FR); Patrick Bastard, Gif sur Yvette (FR)

(73) Assignee: Areva T&D SA, Levallois Perret Cedex (FR)

( * ) Notice: Subject to any disclaimer, the term of this patent is extended or adjusted under 35 U.S.C. 154(b) by 107 days.

(21) Appl. No.: 10/551,919

(22) PCT Filed: Apr. 1, 2004

(86) PCT No.: PCT/FR2004/050137

§ 371 (c)(1),
(2), (4) Date: Oct. 3, 2005

(87) PCT Pub. No.: WO2004/090922

PCT Pub. Date: Oct. 21, 2004

(65) Prior Publication Data

US 2006/0273779 A1    Dec. 7, 2006

(30) Foreign Application Priority Data

Apr. 2, 2003    (FR) .................................. 03 50086

(51) Int. Cl.
H02H 3/00    (2006.01)

(52) U.S. Cl. .......................................... 361/71; 361/62

(58) Field of Classification Search .................. 361/62, 361/63, 65, 69, 70, 71, 75; 307/104, 109
See application file for complete search history.

(56) References Cited

U.S. PATENT DOCUMENTS

| 4,835,651 | A | * | 5/1989 | Li et al. ........................ 361/68 |
| 5,303,112 | A | * | 4/1994 | Zulaski et al. ................ 361/67 |
| 5,455,898 | A | | 10/1995 | Mahoney et al. |
| 5,654,625 | A | | 8/1997 | Konstanzer et al. |
| 5,966,139 | A | | 10/1999 | Anupam et al. |
| 6,091,424 | A | | 7/2000 | Madden et al. |
| 6,392,390 | B1 | | 5/2002 | Ito et al. |

OTHER PUBLICATIONS

"Wavelets and concurrent algorithms"—Y. Meyer et al 1992—English Abstract.

* cited by examiner

Primary Examiner—Michael Sherry
Assistant Examiner—Danny Nguyen
(74) Attorney, Agent, or Firm—Thelen Reid Brown Raysman & Steiner LLP

(57) ABSTRACT

A method for determining the reclose time of a circuit breaker on a three-phase high-voltage electric network after separation of contacts 7A, 8A, 7B, 8B, 7C, 8C in the presence of a fault on one of the three phases A, B or C includes measuring voltages $UL_{A0}$, $UL_{B0}$ and $UL_{C0}$, measuring voltage $US_{A0}$, determining the voltage $US_{A0}$, $US_{B0}$, and $US_{C0}$, calculating the differences $UL_{AB}$, $UL_{AC}$ and $UL_{BC}$, calculating the differences $US_{AB}$, $US_{AC}$, and $US_{BC}$. From these measurements and calculations, a determination of the reclose time is made on the basis of the voltage differences.

5 Claims, 3 Drawing Sheets

METHOD FOR DETERMINING THE MOMENT OF CLOSURE OF A CIRCUIT BREAKER ON A HIGH VOLTAGE LINE

CROSS-REFERENCE TO RELATED APPLICATION

This application claims priority based on International Patent Application No. PCT/FR2004/050137, entitled "Method for Determining the Moment of Closure of a Circuit Breaker on a High Voltage Line" by Jean-Pierre DUPRAZ, Houria SIGUERDIIDJANE, Farah BOUDAOUD and Patrick BASTARD, which claims priority of French Application No. 03 50086, filed on Apr. 2, 2003, and which was not published in English.

BACKGROUND OF THE INVENTION/FIELD OF THE INVENTION

The present invention concerns a method for determining the reclose time of a circuit breaker on an electric network comprising a three-phase transmission line and a high voltage source. The method of the invention is more particularly adapted to extra high voltage lines, i.e. with a nominal source voltage of several hundred kV.

Figure 1:
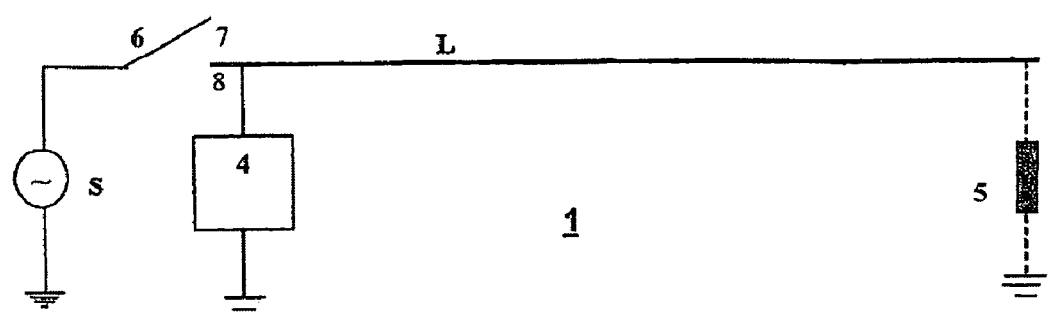

Such an electric network can be modelled according to a first approximation by the equivalent circuit shown FIG. 1. The network 1 comprises:
 a voltage source S,
 a three-phase transmission line L,
 a circuit breaker 6,
 a shunt compensation reactor 5,
 a capacitive voltage transformer 4.

The source voltage S is a very high voltage having a nominal value of 500 kV for example and a network frequency of 50 Hz.

The three-phase transmission line L is a line of length 400 km for example enabling the transport of three phases A, B and C.

By circuit breaker is meant both a circuit breaker commanded by three independent single-pole commands each associated with a phase, and a circuit breaker commanded by a single three-pole command. Generally the three-phase circuit breaker 6 comprises at least three cut-off chambers each associated with one of phases A, B or C. If nominal voltage is high, several cut-off chambers may be connected in series. The circuit breaker 6 therefore comprises at least three pairs of contacts, each pair being associated with one of the three phases of line L and making it possible to interrupt any current circulating between source S and line L by separating the two contacts in the event of a fault on the associated phase, the first contact being on the source side and the second contact being on the line side. Only two contacts 7 and 8 associated with a phase of the circuit breaker 6 are shown in FIG. 1.

The shunt compensation reactor 5 is an inductance coil for example allowing compensation of capacitive reactive power on long, high-voltage, electric power transmission lines.

The capacitive voltage transformer 4 located at the start of the line is used to measure voltage on the line side of the circuit breaker.

A sudden change in configuration of the energy transport network generated by the functioning of a circuit breaker causes a rapid transient overvoltage, called switching surge which propagates over the network. These switching surges may occur on the tripping or reclosing of circuit breakers.

Since the use of circuit breakers without re-enabling has become generalised (i.e. with automatic re-setting of the circuit breaker after tripping) it is on closing and especially on reclosing a line still containing a trapped charge that the highest overvoltages occur.

A first solution to this problem consists of using an auxiliary system comprising a so-called closure resistance in series with a pair of auxiliary contacts, said auxiliary system being mounted in parallel with the cut-off chamber. The auxiliary contacts are actuated a few moments before the contacting of the main contacts so as to insert the closure resistance in the circuit. With this two-step triggering it is possible to reduce closure over-voltages with great efficacy.

This first solution, although very effective, has the drawback of being very costly.

A second solution consists of controlling the reclose times of the circuit breakers using electronic synchronization devices to replace the closure resistances. Said devices allow synchronized switching of a high voltage transmission line.

Therefore, when a single phase fault occurs (which account for more than 90% of line faults) on a high voltage line it is possible in certain networks that the elimination of the fault involves three-pole opening of the circuit breaker followed by almost immediate re-closing (between 300 ms and 1 s) in the endeavour to obtain ensured continuity of service. In this case, two of the phases are therefore vacuum switched by one of the end-of-line circuit breakers. On reclosing, the circuit breaker contacts must be closed at the right time (i.e. substantially at the time when the voltage at the contact terminals of the circuit breaker is zero) on these two vacuum phases, so as to limit overvoltages to an adequate value. This moment varies according to network configuration and must be determined by a closure algorithm in relation to the voltage signals measured on the network and supplied to the algorithm. The choice of right moment for reclosure is based on analysis of the voltage, at the contact terminals of the circuit breaker, of each healthy phase.

However, the implementing of this second solution also raises some difficulties.

For example the lines compensated by shunt reactance have the characteristic, after opening, of oscillating at a frequency in the order of 50 to 90% of the network frequency. This oscillation frequency is chiefly related to line capacity and its shunt compensation reactance. The voltage occurring on the terminals of the circuit breaker therefore shows greater or lesser beats depending upon the extent of compensation which varies in relation to transmitted power. During synchronization on reclosure, zero beat must be targeted to limit overvoltages. The determination of this zero beat is not easy insofar as, in practice, the faulty phase influences the signal of the two healthy phases so that the signal obtained which is to be analysed at the contact terminals of the circuit breaker of the two healthy phases is of very complex shape and difficult to analyse. Consequently results may not reach the desired accuracy of synchronization. Obtaining a satisfactory result i.e. at a determined confidence level, requires a relatively long convergence time for the closure algorithm used.

SUMMARY OF THE INVENTION

The present invention sets out to provide a method for determining the reclose time of a circuit breaker on an electric network, with which it is possible to improve the quality of the signals to be analysed and thereby to reduce the convergence period of the algorithm used for determining the reclose time of the circuit breaker contacts after three-pole tripping due to the presence of a single-phase fault.

For this purpose the present invention proposes a method for determining the reclose time of a circuit breaker on an electric network, said network comprising:

DESCRIPTION OF THE INVENTION

- a high voltage source
- a three-phase transmission line
- a circuit beaker comprising at least three pairs of contacts, each pair being associated with one interruption of any current circulating between said source and said line by the separation of said two contacts in the event of a fault on the associated phase, the first contact being on the source side and the second contact being on the line side,
- a shunt compensation reactor to compensate capacitive reactive power on said line, said reclose time being determined in the event of separation of the contacts of each pair of contacts in the presence of a fault on one of the three phases, said determination of said reclose time being performed using the following steps:
  measuring the voltage between the line side contact and earth, for each of the phases,
  measuring the voltage between the source side contact and earth, for at least one phase,
  determining the voltage between the source side contact and earth, for each of the phases, said determination of said reclose time being characterized in that it also comprises the following steps:
  calculating, for two separate phases called first and second phases, the voltage difference between the line side contact and earth for said first phase, and the voltage difference between the line side contact and earth for said second phase, the calculation being made for each pair of separate phases,
  calculating the voltage difference between the source side contact and earth for said first phase and the voltage difference between the source side contact and earth for said second phase, the calculation being made for each pair of separate phases,
  determining said reclose time on the basis of said voltage differences.

Under the invention, the algorithm for determining reclose time uses input data corresponding to the difference in signals between two phases on the source side and on the line side. With the method of the invention it is therefore possible in particular to calculate the voltage difference between two healthy phases on the line side and on the source side. The faulty phase influences the signals of the two healthy phases and, by using the difference in signals between two healthy phases, it is possible to eliminate the influence of the faulty phase. In this way a signal is recovered whose shape is much simpler to analyse. This makes it possible to use algorithms for determining reclose time that have reduced convergence time for a given confidence level. It is necessary to calculate the difference for each pair of separate phases since it is not known in advance which phase is faulty.

Advantageously, said determination of the reclose time is made by comparing said voltage differences between two healthy phases on the line side and source side.

Advantageously, said determination of said reclose time is made by determining the instant at which the two signals corresponding to the said voltage differences between two healthy phases on the line side and source side are substantially equal and show the same monotony over a non-zero interval about said instant.

Advantageously, said determination of the voltage between the contact on the source side and earth for each of the phases is made by conducting 120° and 240° phase shifting of said voltage measured between the source side contact and earth for at least one phase.

Advantageously, said measurement of the voltage between the line side contact and earth for each phase is made using a voltage transformer.

Other characteristics and advantages of the present invention will become apparent in the following description of an embodiment of the invention given as an illustrative example and in no way restrictive.

Figure 2:
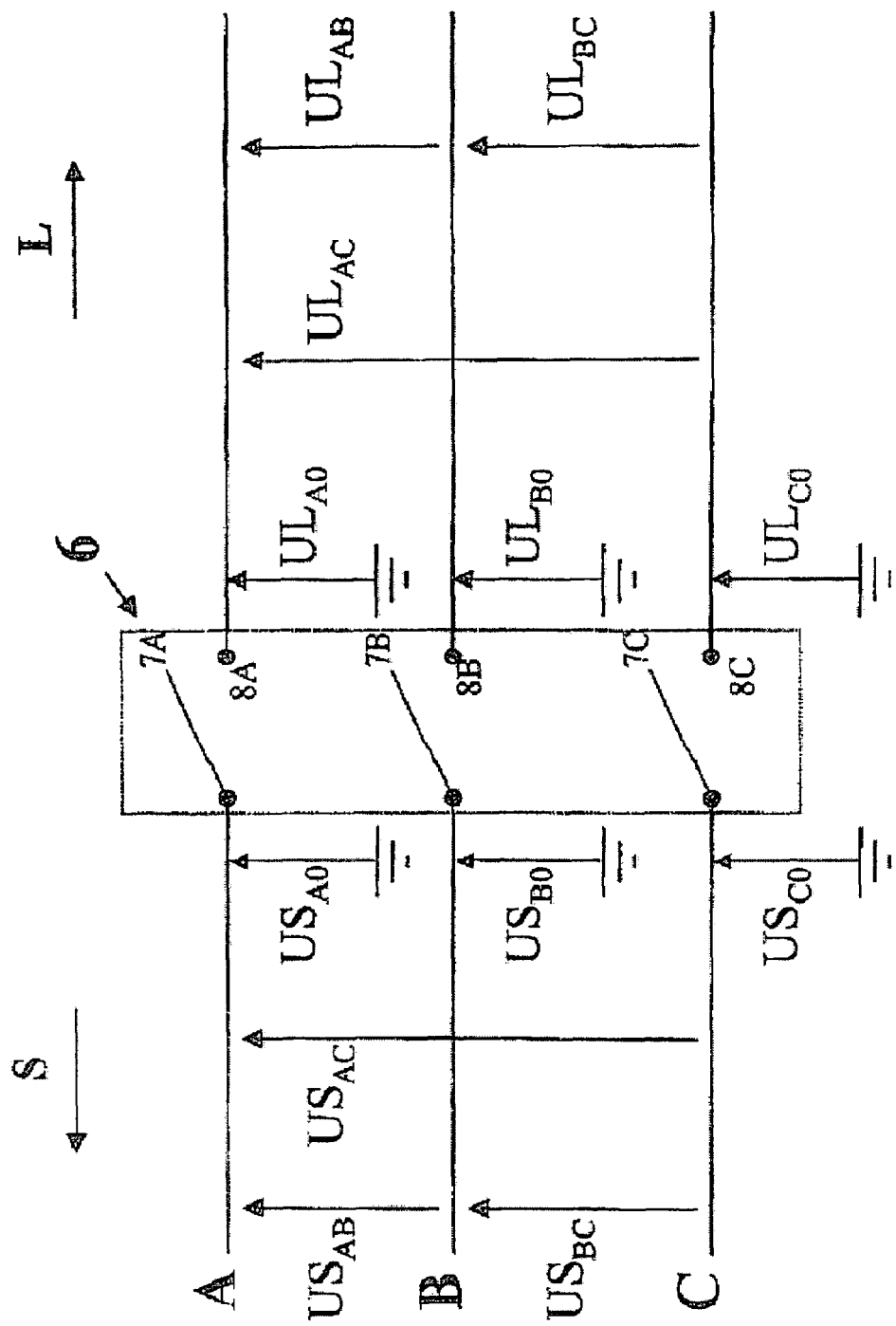
Figure 3:
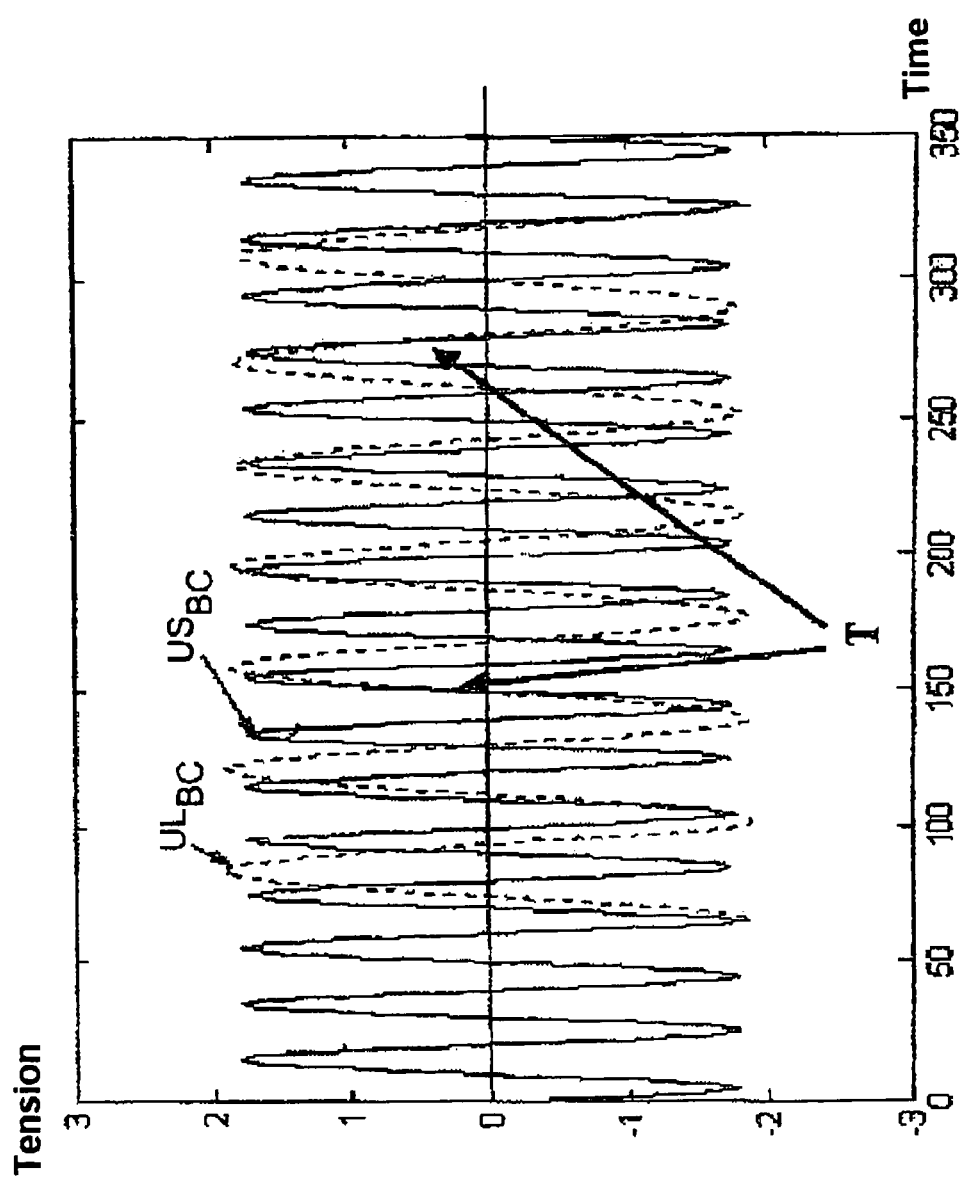

In the following figures:

FIG. 1 gives an equivalent circuit of an extra-high voltage electric network FIG. 2 schematically shows the three phases of an extra high voltage line such as the one in FIG. 1 on which the method of the invention is implemented, FIG. 3 shows two voltage signals obtained using the method of the invention.

In all the figures, the elements in common carry the same reference numbers.

FIG. 1 has already been described in connection with the state of the art.

FIG. 2 is a diagram of the three phases A, B and C of a high voltage line such as the line shown FIG. 1 on which the method of the invention is implemented.

The circuit breaker 6 comprises three pairs of contacts (7A, 8A), (7B, 8B) and (7C, 8C), each pair being associated with one of the three phases A, B or C and enabling the interruption of any current circulating between source S and line L through the separation of the two contacts in the event of a fault on the associated phase, the first contact being on the source side and the second contact being on the line side.

Let us assume that one of the phases A, B or C shows a fault; as a result circuit breaker 6 is tripped for the three phases A, B and C thereby separating the source side S from the line side L; it is said that the circuit breaker has three-pole tripping on a single-phase fault.

The objective of the method according to the invention is to provide the algorithm determining the reclose time of circuit breaker 6 with data signals that are easy to analyse. This algorithm must determine a reclose time at which the voltages at the contact terminals of the circuit breaker are substantially zero. The algorithm used may for example be an algorithm using Prony's method, a neural recognition algorithm or a wavelet analysis algorithm such as described in the work "Wavelets and concurrent algorithms" (Y. Meyer, Hermann, 1992).

The method of the invention comprises a first step to measure the voltages $UL_{A0}$, $UL_{B0}$ and $UL_{C0}$ between the line side contacts of phases A, B and C and earth. These three measurements are made using three capacitive voltage transformers, not shown, each associated with one phase.

In parallel, the method also comprises a voltage measurement step for at least one phase A, B or C between the source side contact of this phase and earth. Let $US_{A0}$ be this voltage between the source side contact of phase A and earth.

The two other voltages $US_{B0}$ and $US_{C0}$ between the contacts for phases B and C and earth are deduced from voltage $US_{A0}$ by 120° and 240° phase shifting of signal $US_{A0}$.

The method of the invention then comprises a calculation step of the six following differences:

$$US_{A0} - US_{B0} = US_{AB}$$

$$US_{A0} - US_{C0} = US_{AC}$$

$$US_{B0} - US_{C0} = US_{BC}$$

$$UL_{A0} - UL_{B0} = UL_{AB}$$

$$UL_{A0} - UL_{C0} = UL_{AC}$$

$$UL_{B0} - UL_{C0} = UL_{BC}$$

These six differences are firstly the three voltage differences between two different phases on the source side, and secondly the three voltage differences between two different phases on the line side.

Let us assume that the initial fault concerns phase A.

Phase A, having a fault, influences the two healthy phases B and C. The differences $US_{B0} - US_{C0} = US_{BC}$ and $UL_{B0} - UL_{C0} = UL_{BC}$ are used to eliminate the effect of phase A on phases B and C, phase A acting in substantially identical manner on the two other healthy phases B and C. In this way two signals are obtained of much simpler form to analyse than signals obtained directly through the differences $US_{B0} - UL_{B0}$ and $US_{C0} - UL_{C0}$; said differences remain disturbed by the faulty phase and provide very difficult signals for subsequent analysis.

It is to be noted that it is necessary to calculate the six differences, and not only the differences related to the two healthy phases, since it is not known in advance which phase is the faulty phase.

The six differences corresponding to signals $US_{AB}$, $US_{AC}$, $US_{BC}$, $UL_{AB}$, $UL_{AC}$ and $UL_{BC}$ are then provided as input data for the determination algorithm which will determine the time of the closure command of circuit breaker 6.

FIG. 3 therefore shows an example of voltage differences $US_{BC}$ (=$US_{B0} - US_{C0}$) and $UL_{BC}$ (=$UL_{B0} - UL_{C0}$) in relation to time in the event of a fault on phase A. Signals $US_{BC}$ and $UL_{BC}$ are near sinusoidal signals that are very scarcely disturbed and therefore relatively easy to analyse by the determination algorithm.

One manner of determining closure time T consists for example of taking position at a time when the two signals $US_{BC}$ and $UL_{BC}$ are substantially equal and show the same monotony over a non-zero interval about T. The two arrows shown in FIG. 3 give two examples of the choice of time T (in the first case the two signals $US_{BC}$ and $UL_{BC}$ increase about T, and in the second case the two signals $US_{BC}$ and $UL_{BC}$ decrease about T).

Evidently the invention is not limited to the embodiment just described.

In particular the measuring, for each of the phases, of the voltage between the line side contact and earth has been described as being made using a capacitive voltage transformer but it may also be made using an inductive voltage transformer.

The invention claimed is:

1. Method for determining a reclose time of a circuit breaker (6) on an electric network, said network comprising:
    a high voltage source (S),
    a thre-phase transmission line (L),
    a circuit breaker (6) comprising at least three pairs of contacts (7A,8A; 7B,8B; 7C,8C), each pair being associated with one of the three phases (A, B C) of said line (L) and allowing an interruption of a current circulating between said source (S) and said line (L) by separating said contacts in the event of a fault on the associated phase, the first contact being on the source side and the second contact being on the line side,
    a shunt compensation reactor (5) to compensate capacitive reactive power of said line (L), said reclose time being determined in the event of separation of the contacts of each pair of contacts in the presence of a fault on one of the three phases,
    said determination of said reclose time being made using the following steps:
        measuring a voltage ($UL_{A0}$, $UL_{B0}$, $UL_{C0}$) between the line side contact and ground for each of the phases,
        measuring the a voltage ($US_{A0}$) between the source side contact and ground for at least one phase,
        determining a voltage ($US_{A0}$, $US_{B0}$, $US_{C0}$) between the source side contact and ground for each of the phases,
    said determination of said reclose time being characterized in that it also comprises the following steps:
        calculating, for two separate phases called first and second phases, the voltage difference ($UL_{AB}$, $UL_{AC}$, $UL_{BC}$) between the line side contact and ground for said first phase, and the voltage difference between the line side contact and ground for said second phase, the calculation being made for each pair of separate phases,
        calculating the voltage difference ($US_{AB}$, $US_{AC}$, $US_{BC}$) between the source side contact and ground for said first phase, and the voltage difference between the source side contact and ground for said second phase, the calculation being made for each pair of separate phases,
        determining said reclose time on the basis of said voltage differences.

2. Method according to claim 1 characterized in that said determination of said reclose time (T) is made by comparing said voltage differences ($US_{BC}$, $UL_{BC}$) between two healthy phases on the line side and source side.

3. Method according to claim 1, characterized in that said determination of said reclose time (T) is made by determining the time at which the two signals corresponding to said voltage differences ($US_{BC}$, $UL_{BC}$) between two healthy phases on the line side and source side are substantially equal and show the same monotony over a non zero interval about said time.

4. Method according to claim 1 characterized in that said determination of the voltage ($US_{A0}$, $US_{B0}$, $US_{C0}$) between the source side contact and ground for each of the phases is made by 120° and 240° phase shifting of said voltage ($US_{A0}$) measured between the source side contact and ground for at least one phase.

5. Method to claim 1, characterized in that said measurement of the voltage between the line side contact and ground for each phase is made using a voltage transformer (4).

* * * * *